Patented Aug. 26, 1947

2,426,560

UNITED STATES PATENT OFFICE 2,426,560

COPOLYMERS OF FLUORO-1,3-BUTADIENE AND AN ALKENYLETHINYL CARBINOL

Walter E. Mochel, Wilmington, Del., assignor to E. I. du Pont de Nemours & Company, Wilmington, Del., a corporation of Delaware No Drawing. Application April 18, 1944, Serial No. 531,641

4 Claims. (Cl. 260—9.2)

This invention relates to improved synthetic rubber-like materials comprising copolymers of fluoroprene and a [(1-alken-2-yl)ethinyl] carbinol.

It is known that polychloroprene rubber is much better suited than natural rubber for applications in which the finished article is exposed to oils or solvents of various types. However, at low temperatures the vulcanizates of this haloprene polymer tend to stiffen and harden more than those of natural rubber, and their utility is lessened to some degree by this deficiency. The corresponding fluoroprene (2-fluoro-butadiene-1,3) polymers are characterized by markedly superior low-temperature properties, and are substantially equivalent in oil resistance, but, on the other hand, they are deficient in tensile strength. Furthermore, under conditions which result in high yields of chloroprene rubbers having satisfactory processing characteristics for commercial use, fluoroprene polymerizes to a product which can be processed only with great difficulty.

It is an object of this invention to provide an improved haloprene rubber of high oil and freeze resistance. A more specific object is to provide improved fluoroprene rubbers. A further and still more specific object is to provide fluoroprene rubbers having improved processing characteristics and better tensile properties without sacrificing their superior oil and freeze resistance.

I have found that synthetic rubber-like materials which have improved oil- and freeze-resistant properties can be produced by polymerizing a mixture comprising 85% to 97% of fluoroprene and 15% to 3% of a [(1-alken-2-yl)ethinyl] carbinol in which the alkenyl group contains from 2 to 6 carbon atoms, and that such synthetic rubber-like material exhibits improved processing characteristics and better tensile properties than the fluoroprene polymer itself. The preparation of these new rubber-like materials is preferably carried out as follows:

A mixture containing 85%–97% of fluoroprene and 3%–15% of a [(1-alken-2-yl)ethinyl] carbinol is dispersed in an aqueous emulsion containing a catalyst of the persulfate or peroxide type and polymerized at a temperature which is preferably in the range 10° to 40° C. The resulting latex, after being stabilized with an antioxidant such as phenyl-alpha-naphthylamine, is coagulated, and the rubber-like coagulum is washed free of residual salts and dried. The plastic product is then compounded, molded and vulcanized.

The [(1-alken-2-yl)ethinyl] carbinols used in this invention may be prepared by the reaction of sodium monovinylacetylide with ketones or aldehydes, as described in U. S. P. 1,963,934, or by the reaction of monovinylacetylenes with ketones in the presence of potassium hydroxide, as described by Nazarov in Bulletin of Academy of Science, USSR (1938), pages 683–94; C. A. 33, 5682.

The fluoroprene may be prepared by the vapor phase reaction of monovinylacetylene with hydrogen fluoride, as described in copending application Serial No. 508,242. The fluoroprene preferably is substantially free of monovinylacetylene, and boils at 11.8° to 12.0° C./760 mm. In purification, the fluoroprene is preferably distilled in an oxygen-free atmosphere so that the product is free of peroxides. Alternatively, the fluoroprene may be prepared by pyrolysis of 2,3-dichloro-2-fluorobutane, preferably in the presence of copper, at temperatures of from 475° to 575° C., as more particularly described in copending application Serial No. 530,556.

Example 1

A mixture of 95 parts of fluoroprene and 5 parts of dimethyl(vinylethinyl) carbinol is emulsified in 157 parts of an aqueous solution containing 4 parts of sodium oleate, 0.5 part of excess sodium hydroxide, 1 part of a formaldehyde/sodium naphthalenesulfonate condensation product, 1 part of potassium persulfate, and 0.1 part of potassium ferricyanide. Two-tenths part of lauryl mercaptan is added, and the emulsion is heated for 5.5 hours at 30° C. in a sealed glass-lined vessel equipped for efficient agitation. The resulting latex is treated with an antioxidant consisting of two parts of a phenyl-alpha-naphthylamine/diphenylamine (55:45) mixture dispersed in water. The stabilized latex is coagulated by means of brine and acetic acid, washed on a corrugated rubber mill to free it of residual salts and to increase the plasticity of the elastomer so that it is more readily processed and compounded, and finally dried on a smooth mill at a temperature of 50°–70° C. The product consists of 93 parts of coherent, plastic material having excellent mill behavior. In the later respect, the product is markedly superior to polyfluoroprene prepared in similar yield.

The dry polymer is compounded according to the following formula:

Formula 1

| | |
|---|---|
| Polymer | 100 |
| Channel carbon black | 40 |
| Stearic acid | 1 |
| Extra light calcined magnesium oxide | 10 |
| Sulfur | 2 |
| Di-ortho-tolylguanidine salt of dicatechol borate | 1 |

The compounded stock is pressed to the desired shape in a mold and cured for 50 minutes at 153° C. under pressure. The vulcanizates have a tensile strength of 3640 lbs./sq. in. at 420% elongation, with excellent freeze resistance, as indicated by a T₅₀ value of −36° C., and good oil resistance, as indicated by a volume increase of only 78% after two days in kerosene at 100° C. The vulcanizates are further characterized by excellent resilience, as indicated by Schopper rebound of 47%, and much better ozone and sunlight resistance than natural rubber. (The $T_{50}$ test used as a measure of freeze resistance is carried out as follows: A vulcanizate of uniform crosssection is stretched at least 170% and cooled slowly to −70° C. in this stretched condition. The tension on the sample is then released, the temperature is raised slowly, and the sample is allowed to contract freely. The temperature at which the sample shows 50% of the total retraction possible is recorded as the $T_{50}$ value. Thus, the lower the $T_{50}$ value, the greater is the freeze resistance.)

A polymer of fluoroprene, prepared in 93% yield under the same conditions as described above, gives a vulcanizate showing a maximum tensile strength of only 2670 lbs./sq. in. at 430% elongation, a $T_{50}$ value of −37° C., and kerosene swell of 75%. The excellent freeze resistance of the above fluoroprene copolymer is best illustrated by comparison with that of polychloroprene which shows a $T_{50}$ value of +4° C.

A series of fluoroprene copolymers containing from 3%–15% of dimethyl(vinylethinyl) carbinol (DMVEC) is prepared as described above. All of the compositions are much easier to process than polyfluoroprene prepared under similar conditions. The properties of these copolymers in tread stock vulcanizates prepared according to Formula 1 are illustrated below:

Table I

| Per cent DMVEC | Tensile Strength, p. s. i. | Per cent Elongation | Per cent Rebound | $T_{50}$, ° C. | Kerosene Absorption, per cent |
|---|---|---|---|---|---|
| 3 | 3,660 | 500 | 46 | −36 | 90 |
| 5 | 3,640 | 420 | 47 | −36 | 78 |
| 10 | 3,530 | 520 | 41 | −33 | 68.5 |
| 15 | 3,640 | 540 | 43 | −32.5 | 66.0 |

It will be noted that there is very little sacrifice in freeze resistance as measured by the $T_{50}$ test upon increasing the carbinol content of the polymer from 3% to 15%.

Example 2

Following the procedure described in Example 1, a mixture of 95 parts of fluoroprene and 5 parts of ethylmethyl (vinylethynyl) carbinol is polymerized to 93% yield in 5.5 hours at 30° C. The product, after being washed and dried, has good processing characteristics, being much superior to polyfluoroprene in this respect. This copolymer is compounded according to Formula 1, and cured 50 minutes at 153° C. The resulting vulcanizate has a tensile strength of 3290 lbs./sq. in. at 405% elongation, a $T_{50}$ value of −39° C., a kerosene absorption of 85%, and a Schopper rebound of 45%.

Example 3

Following the procedure described in Example 1, a mixture of 95 parts of fluoroprene and 5 parts of diisopropyl (vinylethinyl) carbinol is heated for 5.5 hours at 30° C. to obtain an 88% yield of coherent, plastic rubber which can be processed much more readily than polyfluoroprene. This product is compounded according to Formula 1. After being cured for 40 minutes at 153° C., the vulcanizates show a tensile strength of 3830 lbs./sq. in. at 475% elongation, a $T_{50}$ value of −37° C., a kerosene absorption of 101%, and a Schopper rebound of 46%.

Example 4

A mixture of 95 parts of fluoroprene and 5 parts of 1-(vinylethinyl) cyclohexanol is emulsified as described in Example 1, and the emulsion is heated for 5.5 hours at 30° C. The latex is stabilized and coagulated, and the resulting coagulum is washed and dried to yield 88 parts of a coherent, plastic rubber which can be processed much more easily than polyfluoroprene. This polymer is compounded according to Formula 1 and cured for 40 minutes at 153° C. to obtain vulcanizates which show a tensile strength of 3550 lbs./sq. in. at 490% elongation, a $T_{50}$ value of −34° C., a kerosene absorption of 92%, and Schopper rebound of 43%.

Example 5

A mixture of 95 parts of fluoroprene and 5 parts of 1-(vinylethinyl) borneol is emulsified as described in Example 1 and the emulsion is heated for 5.5 hours at 30° C. to effect polymerization. The product, obtained in 82% yield, has good processing characteristics. It is compounded according to Formula 1 and cured for 60 minutes at 153° C. to give vulcanizates which show a tensile strength of 3410 lbs./sq. in. at 475% elongation, a $T_{50}$ value of −34° C., a kerosene absorption of 93%, and a Schopper rebound of 45%.

It is of course to be understood that the above examples are given to illustrate the invention only, and that the ratio of monomers within the limits of 85%–97% of fluoroprene and 15%–3% of the [(1-alken-2-yl) ethinyl] carbinol may be used. At least 3% of such carbinol is required to obtain a significant improvement in mill behavior and tensile properties. In order to retain a high order of freeze-resistance, not more than 15% of the carbinol is employed. It is within this ratio that the [(1-alken-2-yl) ethinyl] carbinols show marked superiority to other materials which have been copolymerized with fluoroprene.

It is preferable in using fluoroprene prepared from monovinylacetylene and hydrogen fluoride that the monomer be essentially free of peroxides and acetylenic compounds, although attractive copolymers from somewhat less pure fluoroprene may be prepared by the proper adjustment of modifiers. Thus, if the fluoroprene contains an appreciable amount of monovinylacetylene, the use, in the polymerization, of an increased proportion of sulfur containing modifier, such as mercaptans, will tend to overcome the deleterious effects of the acetylenic compounds upon the properties of the rubber. While the examples illustrate only the preparation of improved polymers of 2-fluorobutadiene-1,3, it is to be understood that the invention is applicable likewise to polymerizable fluoroprene homologs such as 2-fluoro-3-methylbutadiene-1,3, 2-fluoro-3-ethylbutadiene 1,3 or 2-fluoro-3-propylbutadiene-1,3.

The aliphatic [(1-alken-2-yl) ethinyl] carbinols, and particularly the dialkyl(vinylethinyl)-carbinols such as dimethyl(vinylethinyl) carbinol, are preferred, since they appear to have the most pronounced beneficial effects when used in small amounts, but other [(1-alken-2-yl) ethinyl] carbinols, such as [(1-propen-2-yl) ethinyl] carbinol, methyl[(1-propen-2-yl) ethinyl] carbinol, dimethyl [(1-propen-2-yl)ethinyl] carbinol, methyl ethyl[(1-propen-2-yl)ethinyl] carbinol, [(4-methyl-1-penten-2-yl)ethinyl] carbinol, ethyl[(4-methyl-1-penten-2-yl)ethinyl] carbinol, and dimethyl[(4-methyl-1-penten-2-yl)ethinyl] carbinol, may be used. If an aromatic vinylethinyl carbinol such as diphenyl(vinylethinyl)carbinol is employed, the proportion of carbinol to fluoroprene must be higher than is the case with the aliphatic carbinols, in order to effect the desired improvement in mill behavior. In general, the [(1-alken-2-yl)ethinyl] carbinols used in the practice of this invention may be primary alcohols such as vinylethinyl carbinol, secondary alcohols such as methyl(vinylethinyl)carbinol, or tertiary alcohols such as dimethyl(vinylethinyl)carbinol. The [(1-alken-2-yl)ethinyl] carbinol may be substituted on the carbinol carbon atom by alkyl groups such as ethyl, n-propyl, n-butyl, or isobutyl, or by cyclic groups such as cyclohexyl or furyl. Furthermore, as illustrated by 1-(vinylethinyl)cyclohexanol and 1-(vinylethinyl)borneol, the carbinol carbon atom may be part of an alicyclic or heterocyclic ring.

The polymerization of the monomeric mixture may be carried out by any of the processes usually employed in the polymerization of chloroprene and related products. The emulsion-polymerization is preferred. In the emulsion-polymerization, any of the usual emulsifying agents that have been found useful in emulsion-polymerization of chloroprene, may be employed. In a similar manner, the usual polymerization catalysts, and combinations of polymerization catalysts which have been found useful in effecting emulsion-polymerization of chloroprene, may be used. Polymerization modifiers, such as the mercaptans, disulfides, carbon tetrachloride, etc., may be used. The polymerization may be carried out under the many diverse conditions and in the presence of various ingredients commonly employed for the modification of haloprene or butadiene hydrocarbon polymerization systems. The polymerization temperature may be varied from 5° C. to 80° C., with temperatures of from 20°–40° C. being preferred. The time required to obtain the high yields of polymer will vary, depending upon the temperatures, catalyst, and emulsion system employed.

The polymerized latex may be stabilized in any suitable manner. The addition of a dispersion of an aromatic amine, such as phenyl-alpha-naphthylamine, gives good results. Latex may be coagulated by any of the usual methods, such as with alcohols, brine, salts, freezing, etc. The processing of the coagulant is carried out by any of the conventional means employed in the chloroprene art.

The polymers of this invention may be compounded by employing any of the well known techniques for compounding rubber and butadiene copolymers with sulfur, vulcanization accelerators, metal oxides, etc. The resulting compounds may be molded, sheeted, calendered, etc., in the usual manner.

The vulcanization may be carried out at room temperature or above, although temperatures of from 130° to 170° C. are preferred.

The products of this invention are especially valuable in applications where materials which retain their rubber-like characteristics at low temperatures and in contact with oils or other chemicals are required. Furthermore, they are particularly valuable for applications where ozone- and sunlight-resistance are required in addition to oil- and freeze-resistance. Specific applications requiring one or more of these properties are encountered in certain automobile and airplane parts, such as carburetor or fuel pump diaphragms and gaskets, motor mounts, gasoline hose, door seals, and the like.

I claim:

1. A synthetic rubber-like material, being a copolymer containing from 85% to 97% of a fluoro-1,3-butadiene and from 15% to 3% of a [(1-alken-2-yl)ethinyl] carbinol.

2. A synthetic rubber-like material, being a copolymer containing from 85% to 97% of 2-fluoro-1,3-butadiene and from 15% to 3% of a vinylethinyl carbinol.

3. A synthetic rubber-like material, being a copolymer containing from 85% to 97% of 2-fluoro-1,3-butadiene and from 15% to 3% of an aliphatic vinylethinyl carbinol.

4. A synthetic rubber-like material, being a copolymer containing from 85% to 97% of 2-fluoro-1,3-butadiene and from 15% to 3% of dimethyl(vinylethinyl) carbinol.

WALTER E. MOCHEL.

REFERENCES CITED

The following references are of record in the file of this patent:

UNITED STATES PATENTS

| Number | Name | Date |
| --- | --- | --- |
| 2,066,330 | Carothers et al. | Jan. 5, 1937 |
| 1,950,431 | Carothers et al. | Mar. 13, 1934 |

FOREIGN PATENTS

| Number | Country | Date |
| --- | --- | --- |
| 497,841 | Great Britain | Dec. 28, 1938 |